United States Patent [19]
Cook

[11] 3,916,167
[45] Oct. 28, 1975

[54] COUNTERS
[75] Inventor: John Hayward Cook, Sawbridgeworth, England
[73] Assignee: Xerox Corporation, Stamford, Conn.
[22] Filed: Apr. 15, 1974
[21] Appl. No.: 464,014

[52] U.S. Cl. ............ 235/132 R; 235/103; 235/91 R; 355/14
[51] Int. Cl.² ......................................... G06F 15/18
[58] Field of Search ............ 235/132 R, 132 A, 103, 235/91 R; 355/14

[56] References Cited
UNITED STATES PATENTS

| | | | |
|---|---|---|---|
| 3,195,815 | 7/1965 | Sackley | 235/132 R |
| 3,229,908 | 1/1966 | Niesen et al. | 235/132 R |
| 3,564,593 | 2/1971 | Bielik | 235/132 R |
| 3,641,322 | 2/1972 | Limberger | 235/132 R |
| 3,710,079 | 1/1973 | Cralle, Jr. et al. | 235/91 R |

Primary Examiner—Stephen J. Tomsky
Attorney, Agent, or Firm—James J. Ralabate; Bernard A. Chiama; Earl T. Reichert

[57] ABSTRACT

A mechanical counter has a linear scale, an indicator which can be set to a desired digit location on the scale, and a stop member which is movable along the scale and biased toward the high end of the scale. when a button is depressed to disengage a first pawl from a ratchet, the stop member moves along the scale until engaged by the indicator. A second pawl connected to a machine drive reciprocates so as to index the ratchet by one position for each operation of the machine. When the ratchet has been indexed back to a zero position, the machine stops. This is accomplished by a microswitch which is closed in response to movement of a disc which moves with the indexing of the ratchet, the disc having a notch which receives a follower of the microswitch when the stop member reaches the zero position.

6 Claims, 2 Drawing Figures

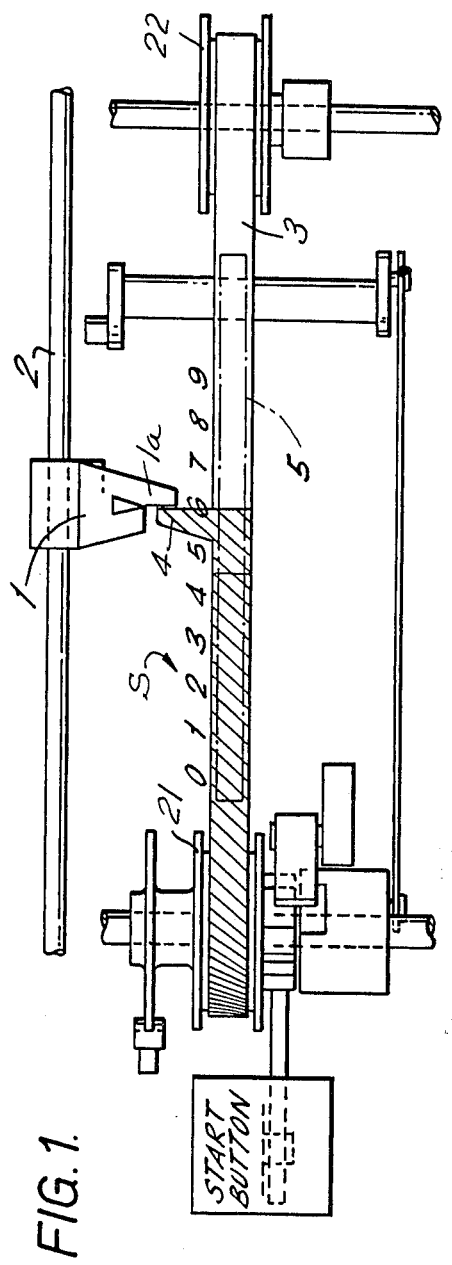
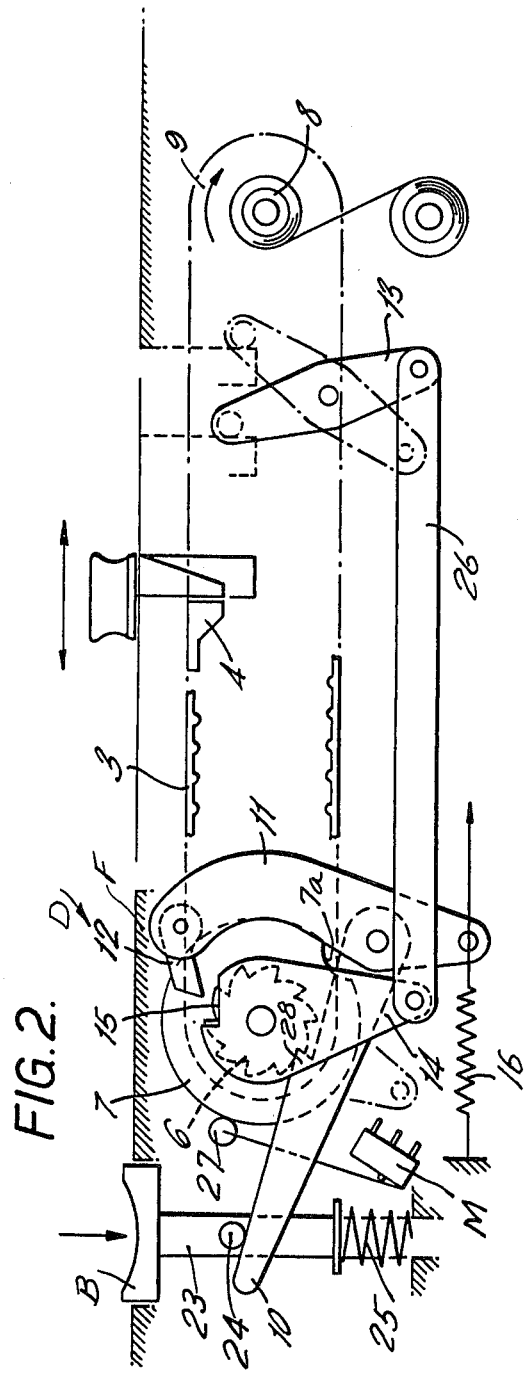
FIG.1.
FIG.2.

COUNTERS

BACKGROUND OF THE INVENTION

This invention relates to mechanical counters.

Counters are known, for example from British Patent Specification No. 1,308,219, in which one or more digit wheels are set manually to a desired number, after which input signals cause countdown of the displayed number until zero is reached at which point an output is actuated.

Generally, such counters require substantial depth clearance beneath the display facia, being unsuitable in some circumstances where the depth clearance beneath the display facia is limited, and it is an object of the present invention to alleviate the foregoing disadvantage.

SUMMARY OF THE INVENTION

To this end the present invention provides a mechanical counter having a linear scale and including an indicator presettable to a desired digit location on said scale, a stop member moveable along said scale, being biased towards the high end of the scale and adapted to be engaged by said indicator, and means operatively associated with said stop member for drivng the latter against the biasing force in steps each corresponding to a unit on said scale.

In a preferred embodiment, the drive means comprises a pawl and ratchet device of which the ratchet has a number of teeth corresponding to the number of units on the scale, a first pawl normally disengaged from said ratchet is actuable to index the ratchet through a distance corresponding to one tooth, and a second pawl normally in engagement with the ratchet is disengageable to permit the stop member to move towards the indicator under the action of the biasing force. The stop member is suitably mounted on an endless belt, cable or like member passing over a pair of spaced pulleys or the like, the pawl being mounted on one of said pulleys in fixed rotational relationship thereto. Suitably the biasing force is provided by means of a torsion spring acting on the other of the pulleys.

Advantageously the indicator may be moved to a position beyond the scale in which the drive means is disengaged thereby rendering the counter inoperative and in the embodiment described above this is conveniently achieved by a member normally positioned such that engagement of the first pawl with the ratchet is permitted and which is moved to a position in which it prevents engagement of the first pawl with the ratchet by moving the indicator to such position beyond the scale.

A counter according to the invention has particular utility in the control of machines in which an operation or cycle is to be repeated a desired number of times which will vary according to circumstance. Thus, by operatively connecting the drive means of the counter to the machine so that the latter receives a signal from the machine at the completion of each operation or cycle to initiate a countdown of one unit and by providing the counter with means for switching off the machine when the counter has counted down to zero, the number of machine operations or cycles performed may be controlled in a simple and effective manner.

BRIEF DESCRIPTION OF THE DRAWINGS

In order that the invention may be more readily understood, reference will now be made to the accompanying drawings, in which:

FIG. 1 is a plan view of an embodiment of counter according to the invention, and FIG. 2 is a side elevation of the counter shown in FIG. 1.

DETAILED DESCRIPTION OF THE INVENTION

Referring to the drawings, the counter has a linear scale marked from zero to a desired maximum number, a scale reading from 0 to 9 being shown, and includes an indicator 1 mounted on a rod 2 arranged alongside and parallel to the scales, the indicator being presettable to a desired digit location on the scale by sliding it along the rod. A stop 4 moveable along the scale is biased towards the high end of the latter as will be described and is arranged to be engaged by a lug 1a on the indicator. A drive mechanism D operatively associated with the stop member 4 is actuable to drive the stop member against the biasing force in steps each corresponding to a unit on the scale.

The stop member 4 is fixed to an endless toothed belt 3 which passes over a pair of pulleys 21, 22 arranged beyond opposite ends respectively of the scale. The belt is marked on its outer surface up to a line coincident with the front end of the stop 4 to provide a readily discernible visual indication of the location of the stop at all times. This marking is shown by the shading in FIG. 1 and shows through an aperture, schematically indicated by the broken line outline 5 in FIG. 1, in the display facia F of the counter; the aperture is, as seen, arranged alongside the linear counter scale.

The drive mechanism D comprises a pawl and ratchet device arranged on the axis of the pulley 21, whilst the biasing force is provided by a spring drum 8 mounted in fixed rotational relationship with the pulley 22 such that the latter is spring urged in the direction of arrow 9.

The pawl and ratchet device includes, fixedly mounted on the pulley 21 for rotation therewith, a ratchet 6 having a number of teeth equal to the number of units on the linear scale, in this instance ten (0–9), and a notched disc 7 which actuates a micro-switch at zero. A first pawl 12 is mounted on a reciprocable drive arm 11 biased by a spring 16 to a position in which the pawl is out of engagement with the ratchet. A second pawl 28 on an arm 10 is normally urged into engagement with the ratchet and may be disengaged by depressing a push button B in the facia F. As shown the button B is carried on a rod 23 having a detent 24 which engages the arm 10 and is biased to its raised position by a spring 25.

In use, the counter is suitably operatively associated with a machine for controlling the number of operations or cycles performed by the machine. The indicator 1 is manually set along the scale to the number of operations or cycles required, say six, and the start button B is depressed whereupon the ratchet 6 is released to permit the stop member to move along the scale under the action of spring force 8 until it reaches the indicator 1 and is arrested by the lug 1a thereon. The start button B is then released to reengage the pawl on the arm 10 with the ratchet 6 and in this position the marked portion of the belt indicates six operations or cycles. The drive arm 11 is operatively connected to the machine drive so as to be reciprocated such that the pawl 12 engages the ratchet 6 and indexes the latter by one position once for each operation or cycle of the machine. Each time this happens the end of the marked area on the belt 3 moves down the scale by one unit so that following the first indexing movement of the arm 11 the end of the marked area on the belt has moved to opposite the digit 5, although the indicator remains opposite the digit 6. The procedure is repeated at the end of each machine operation or cycle until the marked area on the belt, and thus the stop 4, has reached zero at which point a notch 7a in the disc 7 receives a follower 27 of the microswitch M to close the latter and thereby switch off the machine.

For the next machine run, the indicator 1 may be reset or left at digit location 6. When the start button B is depressed, the belt 3 returns the stop member 4 to the indicator position and the countdown sequence is repeated.

In order to permit a machine run composed of a number of operations or cycles greater than the number of units on the linear scale, means are provided in this embodiment to disengage the drive D and thus the counter. As shown, the indicator 1 is moveable to a further location beyond the high end of the scale in which position it engages a lever 13 connected by a link 26 to a notched lever 14 pivotally mounted on the axis of the pulley 21. In the full line position of this mechanism shown in FIG. 2, a notch 15 in the lever 14 permits engagement of the pawl 12 with the ratchet. However, when the indicator 1 is moved to the further location the lug 1a engages the upper end of the lever 13 to rotate the lever 14 clockwise as shown in FIG. 2 such that notch 15 is indexed one tooth position of the ratchet 6. In this position the pawl 12 is held clear of the ratchet 6 during the count sequence and the machine will run until the indicator is moved from the further position.

A counter according to this invention is particularly suitable for use in controlling the number of copy cycles performed by a photocopying machine such as an electrostatographic copying machine. In the practice of electrostatography, various procedures may be followed but by way of illustration an electrostatographic image may be formed on a surface, e.g., the surface of a drum, comprising a layer of photo-conductive insulating material affixed to a conductive backing which is electrically charged uniformly to render it photosensitive, is then exposed to light from a given image so that an electrostatic latent image is formed thereon in accordance with the light image cast thereon, and finally is caused to be approached by a developer material, which may be fine coloured particles carrying electric charge (referred to as toner), or it may be in liquid form, so that the developer material is attracted selectively to the electrostatic latent image, converting the latent image into a visible image. The powder or liquid may subsequently be transferred to a sheet of paper and suitably affixed to it so as to form a permanent print.

In making a single copy from an original using such a process each of the above described operations is performed during a single machine cycle. It is however often desired to make multiple copies from a single original so that the machine cycle is repeated according to the number of copies required. A counter according to this invention is particularly suitable for use in such a machine for controlling the number of copies made whilst permitting varying numbers of copies to be made from different originals.

Whilst a specific embodiment of the invention has been described above, it will be appreciated that various modifications may be made without departing from the scope of the invention as defined in the appended claims. For example, whilst the counter described above has a nine unit scale, this may be altered, in which case the number of teeth on the ratchet wheel 6 will be changed accordingly. Further, whilst the stop member is, in the embodiment described above, connected to an endless belt it may be driven through any other suitable member such as a cable or the like, which may or may not be endless.

What I claim is:

1. A mechanical counter having a linear scale and including an indicator presettable to a desired digit location on said scale, a stop member moveable along said scale and adapted to be engaged by said indicator, means biasing said stop member toward the high end of said scale, and means operatively associated with said stop member for driving the latter against said biasing force in steps each corresponding to a unit on said scale.

2. A counter as claimed in claim 1, including drive means which comprises a ratchet having a number of teeth corresponding to the number of units on the scale, a first pawl normally disengaged from said ratchet and mounted so as to index the ratchet through distance corresponding to one tooth, and a second pawl normally in engagement with the ratchet mounted so that it can be disengaged to permit said stop member to move towards the indicator under the action of the biasing force.

3. A counter as claimed in claim 2, including a pair of spaced pulleys and a flexible belt mounted on said pulleys the ratchet being mounted on one of said pulleys in fixed rotational relationship thereto.

4. A counter as claimed in claim 2 and further including means for disengaging said drive means if said indicator is moved to a position beyond said scale.

5. A counter as claimed in claim 4 and further including means for preventing engagement of said first pawl with said ratchet by moving said indicator to said position beyond the scale.

6. A counter as claimed in claim 1 for use in a reproduction machine for controlling the operation thereof, and including means for switching off the machine when said stop member is in a position corresponding to zero on the scale.

* * * * *